(12) United States Patent
Yang et al.

(10) Patent No.: US 12,445,244 B2
(45) Date of Patent: Oct. 14, 2025

(54) SOUNDING REFERENCE SIGNAL RESOURCE SET DETERMINATION FOR DOWNLINK CONTROL INFORMATION

(71) Applicant: QUALCOMM Incorporated, San Diego, CA (US)

(72) Inventors: Wei Yang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 17/820,458

(22) Filed: Aug. 17, 2022

(65) Prior Publication Data

US 2023/0058509 A1    Feb. 23, 2023

Related U.S. Application Data

(60) Provisional application No. 63/260,378, filed on Aug. 18, 2021.

(51) Int. Cl.
*H04L 5/00*    (2006.01)
*H04W 72/23*    (2023.01)

(52) U.S. Cl.
CPC .......... *H04L 5/0048* (2013.01); *H04W 72/23* (2023.01)

(58) Field of Classification Search
CPC ..... H04L 5/0048; H04L 5/0053; H04W 72/33
See application file for complete search history.

(56) References Cited

U.S. PATENT DOCUMENTS

2011/0310818 A1    12/2011  Lin et al.
2019/0273637 A1*    9/2019  Zhang .................. H04L 5/0051
(Continued)

FOREIGN PATENT DOCUMENTS

WO    WO-2020198914 A1    10/2020

OTHER PUBLICATIONS

CATT: "Discussion on SRS Enhancement for Rel-17", 3GPP TSG RAN WG1 #104-e, R1-2100348, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, 17 Pages, XP051970951, Sections 1-5, p. 6, paragraph 3 tables 1-3, p. 12, paragraph 4.1.

(Continued)

*Primary Examiner* — Donald L Mills
(74) *Attorney, Agent, or Firm* — Harrity & Harrity, LLP

(57) ABSTRACT

Various aspects of the present disclosure generally relate to wireless communication. In some aspects, a user equipment (UE) may receive first signaling and second signaling, wherein the first signaling is radio resource control signaling and the second signaling is downlink control information signaling, and wherein the first signaling and the second signaling include a first configuration information associated with identifying a first sounding reference signal (SRS) resource set and a second configuration information associated with identifying a second SRS resource set. The UE may transmit an SRS associated with one of the first SRS resource set or the second SRS resource set, wherein the SRS is associated with the one of the first SRS resource set or the second SRS resource set based at least in part on a format of the downlink control information. Numerous other aspects are described.

30 Claims, 9 Drawing Sheets

(56) References Cited

U.S. PATENT DOCUMENTS

| | | | | |
|---|---|---|---|---|
| 2020/0336264 A1* | 10/2020 | Faxér | .................... | H04B 7/0617 |
| 2022/0045884 A1* | 2/2022 | Lin | ....................... | H04W 72/23 |
| 2022/0337373 A1* | 10/2022 | Wu | ....................... | H04L 5/0091 |
| 2023/0049134 A1* | 2/2023 | Liu | ....................... | H04L 5/0096 |
| 2023/0163917 A1* | 5/2023 | Wang | .................... | H04L 5/0094 |
| | | | | 370/329 |
| 2023/0379118 A1* | 11/2023 | Nilsson | ................. | H04L 5/0007 |

OTHER PUBLICATIONS

International Search Report and Written Opinion—PCT/US2022/075144—ISA/EPO—Dec. 8, 2022.

Qualcomm Incorporated: "Remaining Issues on PDCCH Enhancements for URLLC", 3GPP TSG RAN WG1 #106-e, R1-2107318, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 6, 2021, pp. 1-3, XP052038271, Sections 1-3.

* cited by examiner

SOUNDING REFERENCE SIGNAL RESOURCE SET DETERMINATION FOR DOWNLINK CONTROL INFORMATION

CROSS-REFERENCE TO RELATED APPLICATION

This patent application claims priority to U.S. Provisional Patent Application No. 63/260,378, filed on Aug. 18, 2021, entitled "SOUNDING REFERENCE SIGNAL RESOURCE SET DETERMINATION FOR DOWNLINK CONTROL INFORMATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for sounding reference signal resource set determination for downlink control information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving first signaling, wherein the first signaling is radio resource control signaling, and wherein the first signaling includes first configuration information associated with identifying a first sounding reference signal (SRS) resource set and second configuration information associated with identifying a second SRS resource set; receiving second signaling, wherein the second signaling is downlink control information signaling, and wherein the second signaling includes a trigger for an SRS transmission associated with one of the first SRS resource set or the second SRS resource set; and transmitting the SRS transmission associated with the one of the first SRS resource set or the second SRS resource set, wherein the SRS is associated with the one of the first SRS resource set or the second SRS resource set based at least in part on a format of the downlink control information signaling.

Some aspects described herein relate to a method of wireless communication performed by a base station. The method may include transmitting first signaling, wherein the first signaling is radio resource control signaling, and wherein the first signaling includes first configuration information associated with identifying a first SRS resource set and second configuration information associated with identifying a second SRS resource set; transmitting second signaling, wherein the second signaling is downlink control information signaling, and wherein the second signaling includes a trigger for an SRS transmission associated with one of the first SRS resource set or the second SRS resource set; and receiving the SRS transmission associated with the one of the first SRS resource set or the second SRS resource set, wherein the SRS is associated with the one of the first SRS resource set or the second SRS resource set based at least in part on a format of the downlink control information signaling.

Some aspects described herein relate to a UE for wireless communication. The UE may include a memory and one or more processors coupled to the memory. The one or more processors may be configured to receive first signaling, wherein the first signaling is radio resource control signaling, and wherein the first signaling includes first configuration information associated with identifying a first SRS resource set and second configuration information associated with identifying a second SRS resource set. The one or more processors may be configured to receive second signaling, wherein the second signaling is downlink control information signaling, and wherein the second signaling includes a trigger for an SRS transmission associated with one of the first SRS resource set or the second SRS resource set. The one or more processors may be configured to transmit the SRS transmission associated with the one of the first SRS resource set or the second SRS resource set, wherein the SRS is associated with the one of the first SRS resource set or the second SRS resource set based at least in part on a format of the downlink control information signaling.

Some aspects described herein relate to a base station for wireless communication. The base station may include a memory and one or more processors coupled to the memory. The one or more processors may be configured to transmit first signaling, wherein the first signaling is radio resource control signaling, and wherein the first signaling includes first configuration information associated with identifying a first SRS resource set and second configuration information associated with identifying a second SRS resource set. The one or more processors may be configured to transmit second signaling, wherein the second signaling is downlink control information signaling, and wherein the second signaling includes a trigger for an SRS transmission associated with one of the first SRS resource set or the second SRS resource set. The one or more processors may be configured to receive the SRS transmission associated with the one of the first SRS resource set or the second SRS resource set, wherein the SRS is associated with the one of the first SRS resource set or the second SRS resource set based at least in part on a format of the downlink control information signaling.

Some aspects described herein relate to a non-transitory computer-readable medium that stores a set of instructions for wireless communication by a UE. The set of instructions, when executed by one or more processors of the UE, may cause the UE to receive first signaling, wherein the first signaling is radio resource control signaling, and wherein the first signaling includes first configuration information associated with identifying a first SRS resource set and second configuration information associated with identifying a second SRS resource set. The set of instructions, when executed by one or more processors of the UE, may cause the UE to receive second signaling, wherein the second signaling is downlink control information signaling, and wherein the second signaling includes a trigger for an SRS transmission associated with one of the first SRS resource set or the second SRS resource set. The set of instructions, when executed by the one or more processors of the UE, may cause the UE to transmit the SRS transmission associated with the one of the first SRS resource set or the second SRS resource set, wherein the SRS is associated with the one of the first SRS resource set or the second SRS resource set based at least in part on a format of the downlink control information signaling.

Some aspects described herein relate to a non-transitory computer-readable medium that stores a set of instructions for wireless communication by a base station. The set of instructions, when executed by one or more processors of the base station, may cause the base station to transmit first signaling, wherein the first signaling is radio resource control signaling, and wherein the first signaling includes first configuration information associated with identifying a first SRS resource set and second configuration information associated with identifying a second SRS resource set. The set of instructions, when executed by the one or more processors of the base station, may cause the base station to transmit second signaling, wherein the second signaling is downlink control information signaling, and wherein the second signaling includes a trigger for an SRS transmission associated with one of the first SRS resource set or the second SRS resource set. The set of instructions, when executed by the one or more processors of the base station, may cause the base station to receive the SRS transmission associated with the one of the first SRS resource set or the second SRS resource set, wherein the SRS is associated with the one of the first SRS resource set or the second SRS resource set based at least in part on a format of the downlink control information signaling.

Some aspects described herein relate to an apparatus for wireless communication. The apparatus may include means for receiving first signaling, wherein the first signaling is radio resource control signaling, and wherein the first signaling includes first configuration information associated with identifying a first SRS resource set and second configuration information associated with identifying a second SRS resource set. The apparatus may include means for receiving second signaling, wherein the second signaling is downlink control information signaling, and wherein the second signaling includes a trigger for an SRS transmission associated with one of the first SRS resource set or the second SRS resource set. The apparatus may include means for transmitting the SRS transmission associated with the one of the first SRS resource set or the second SRS resource set, wherein the SRS is associated with the one of the first SRS resource set or the second SRS resource set based at least in part on a format of the downlink control information signaling.

Some aspects described herein relate to an apparatus for wireless communication. The apparatus may include means for transmitting first signaling, wherein the first signaling is radio resource control signaling, and wherein the first signaling includes first configuration information associated with identifying a first SRS resource set and second configuration information associated with identifying a second SRS resource set. The apparatus may include means for transmitting second signaling, wherein the second signaling is downlink control information signaling, and wherein the second signaling includes a trigger for an SRS transmission associated with one of the first SRS resource set or the second SRS resource set. The apparatus may include means for receiving the SRS transmission associated with the one of the first SRS resource set or the second SRS resource set, wherein the SRS is associated with the one of the first SRS resource set or the second SRS resource set based at least in part on a format of the downlink control information signaling.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
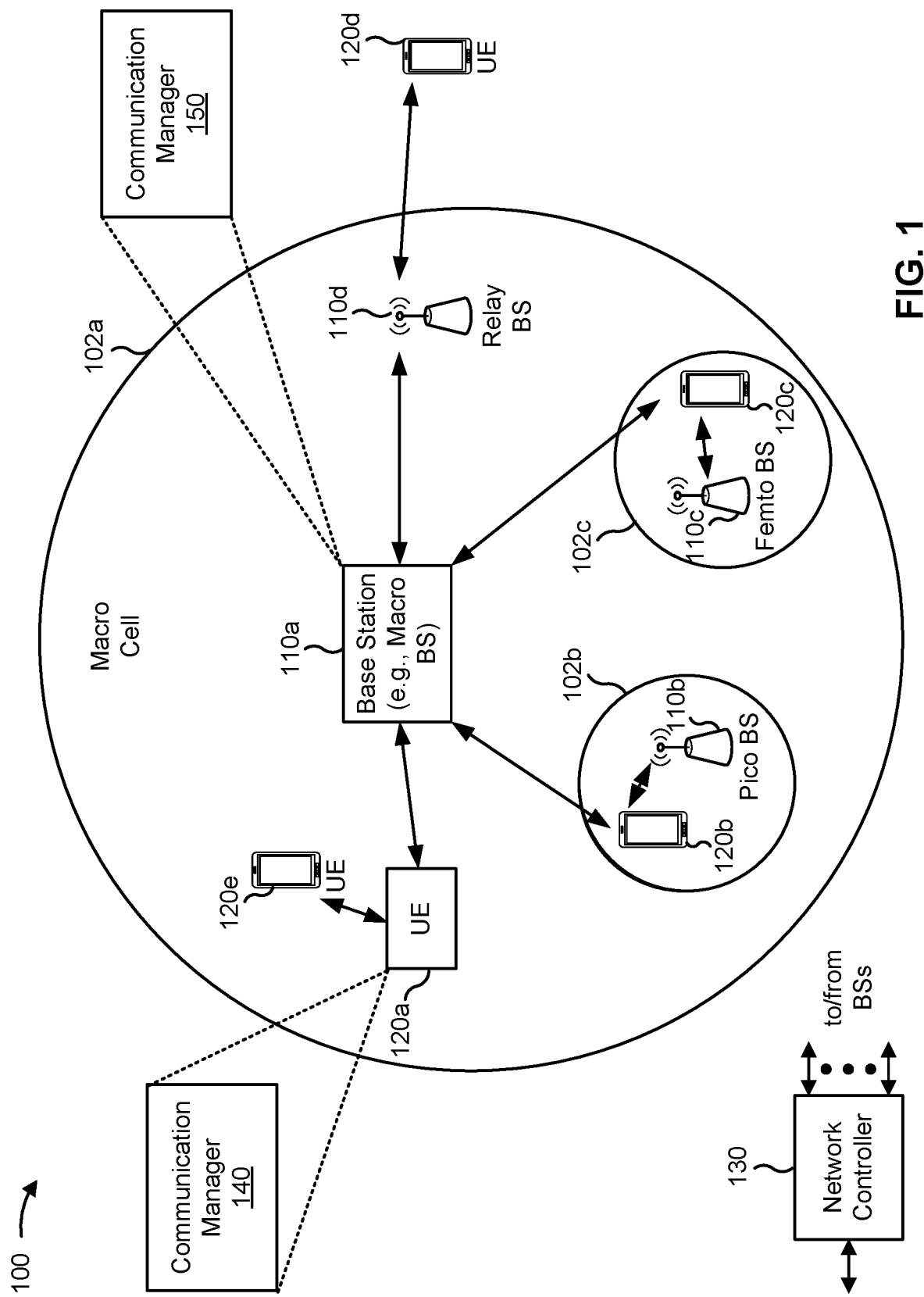
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4*a* or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive first signaling, wherein the first signaling is radio resource control signaling, and wherein the first signaling includes first configuration information associated with identifying a first sounding reference signal (SRS) resource set and second configuration information associated with identifying a second SRS resource set; receive second signaling, wherein the second signaling is downlink control information signaling, and wherein the second signaling includes a trigger for an SRS transmission associated with one of the first SRS resource set or the second SRS resource set; and transmit the SRS transmission associated with the one of the first SRS resource set or the second SRS resource set, wherein the SRS is associated with the one of the first SRS resource set or the second SRS resource set based at least in part on a format of the downlink control information signaling Additionally, or alternatively, the communication manager 140 may perform one or more other operations described herein.

In some aspects, a base station (e.g., the base station 110) may include a communication manager 150. As described in more detail elsewhere herein, the communication manager 150 may transmit first signaling, wherein the first signaling is radio resource control signaling, and wherein the first signaling includes first configuration information associated with identifying a first SRS resource set and second configuration information associated with identifying a second SRS resource set; transmit second signaling, wherein the second signaling is downlink control information signaling, and wherein the second signaling includes a trigger for an SRS transmission associated with one of the first SRS resource set or the second SRS resource set; and/or receive the SRS transmission associated with the one of the first SRS resource set or the second SRS resource set, wherein the SRS is associated with the one of the first SRS resource set or the second SRS resource set based at least in part on a format of the downlink control information signaling Additionally, or alternatively, the communication manager 150 may perform one or more other operations described herein.

As indicated above, FIG. 1 is provided as an example. Other examples may differ from what is described with regard to FIG. 1.

Figure 2:
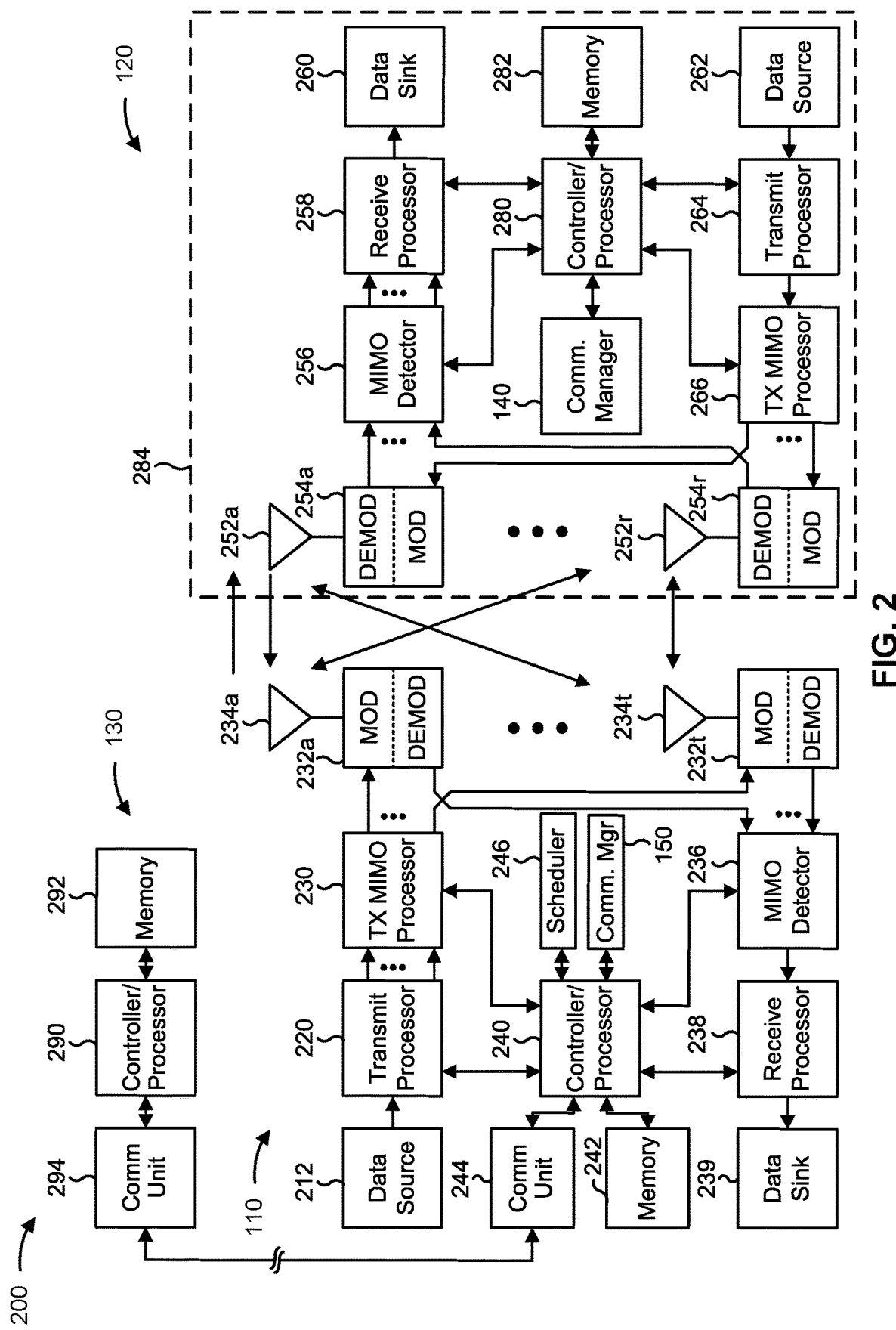
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with SRS resource set determination for downlink control information, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for receiving first signaling, wherein the first signaling is radio resource control signaling, and wherein the first signaling includes first configuration information associated with identifying a first SRS resource set and second configuration information associated with identifying a second SRS resource set; means for receiving second signaling, wherein the second signaling is downlink control information signaling, and wherein the second signaling includes a trigger for an SRS transmission associated with one of the first SRS resource set or the second SRS resource set; and/or means for transmitting the SRS transmission associated with the one of the first SRS resource set or the second SRS resource set, wherein the SRS is associated with the one of the first SRS resource set or the second SRS resource set based at least in part on a format of the downlink control information signaling. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station (e.g., the base station 110) includes means for transmitting first signaling, wherein the first signaling is radio resource control signaling, and wherein the first signaling includes first configuration information associated with identifying a first SRS resource set and second configuration information associated with identifying a second SRS resource set; means for transmitting second signaling, wherein the second signaling is downlink control information signaling, and wherein the second signaling includes a trigger for an SRS transmission associated with one of the first SRS resource set or the second SRS resource set; and/or means for receiving the SRS transmission associated with the one of the first SRS resource set or the second SRS resource set, wherein the SRS is associated with the one of the first SRS resource set or the second SRS resource set based at least in part on a format of the downlink control information signaling. The means for the base station (e.g., the base station 110) to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

In some aspects, the term "base station" (e.g., the base station 110) or "network node" or "network entity" may refer to an aggregated base station, a disaggregated base station, an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

Figure 3:
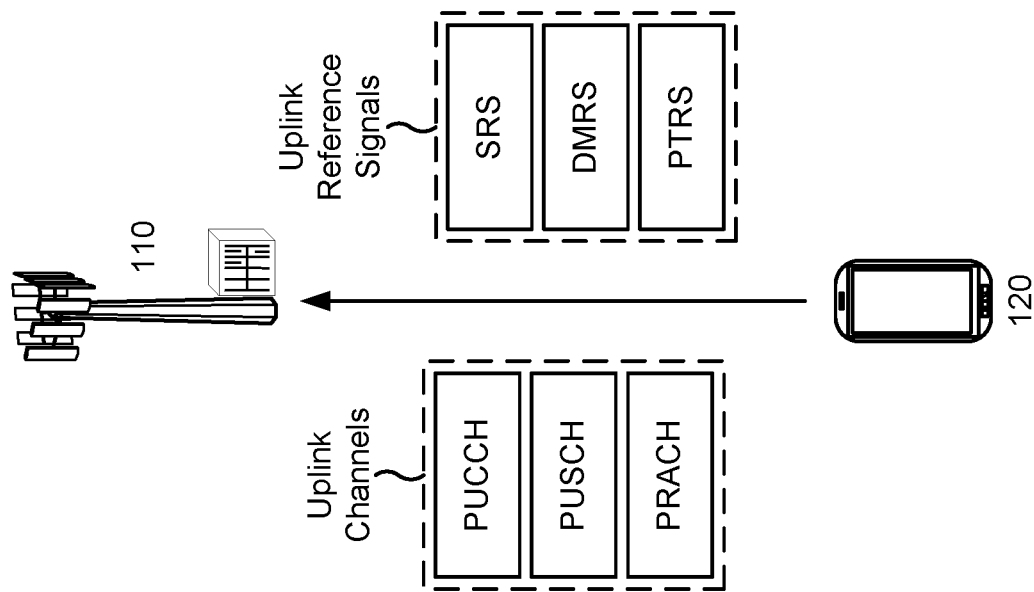
FIG. 3 is a diagram illustrating an example of physical channels and reference signals in a wireless network, in accordance with the present disclosure.
Figure 3:
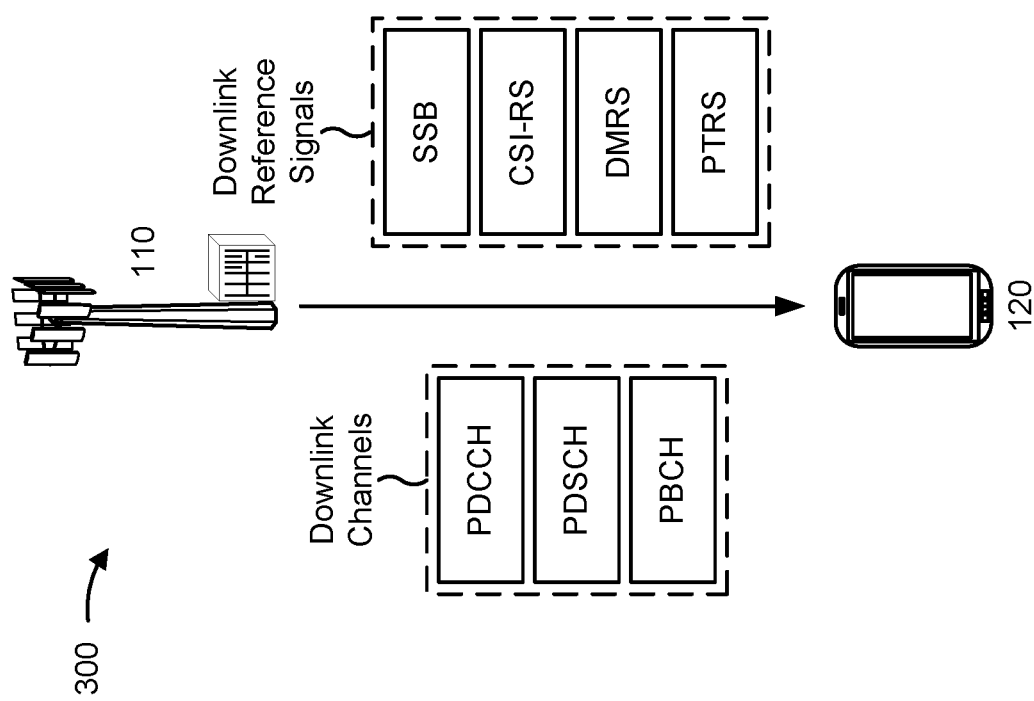

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. DCI may include information associated with configuring sounding reference signal (SRS) transmission. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include an SRS, a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. For example, the base station 110 may transmit radio resource control (RRC) signaling and/or DCI signaling identifying one or more SRS resource sets, such as a codebook-based SRS resource set or a non-codebook-based SRS resource set, among other examples, as described in more detail herein. An SRS resource set may have a configured usage (e.g., configured in an RRC usage parameter), such as a codebook-based use case, a non-codebook-based use case, uplink CSI acquisition, downlink CSI acquisition for reciprocity-based operations, antenna switching, or uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
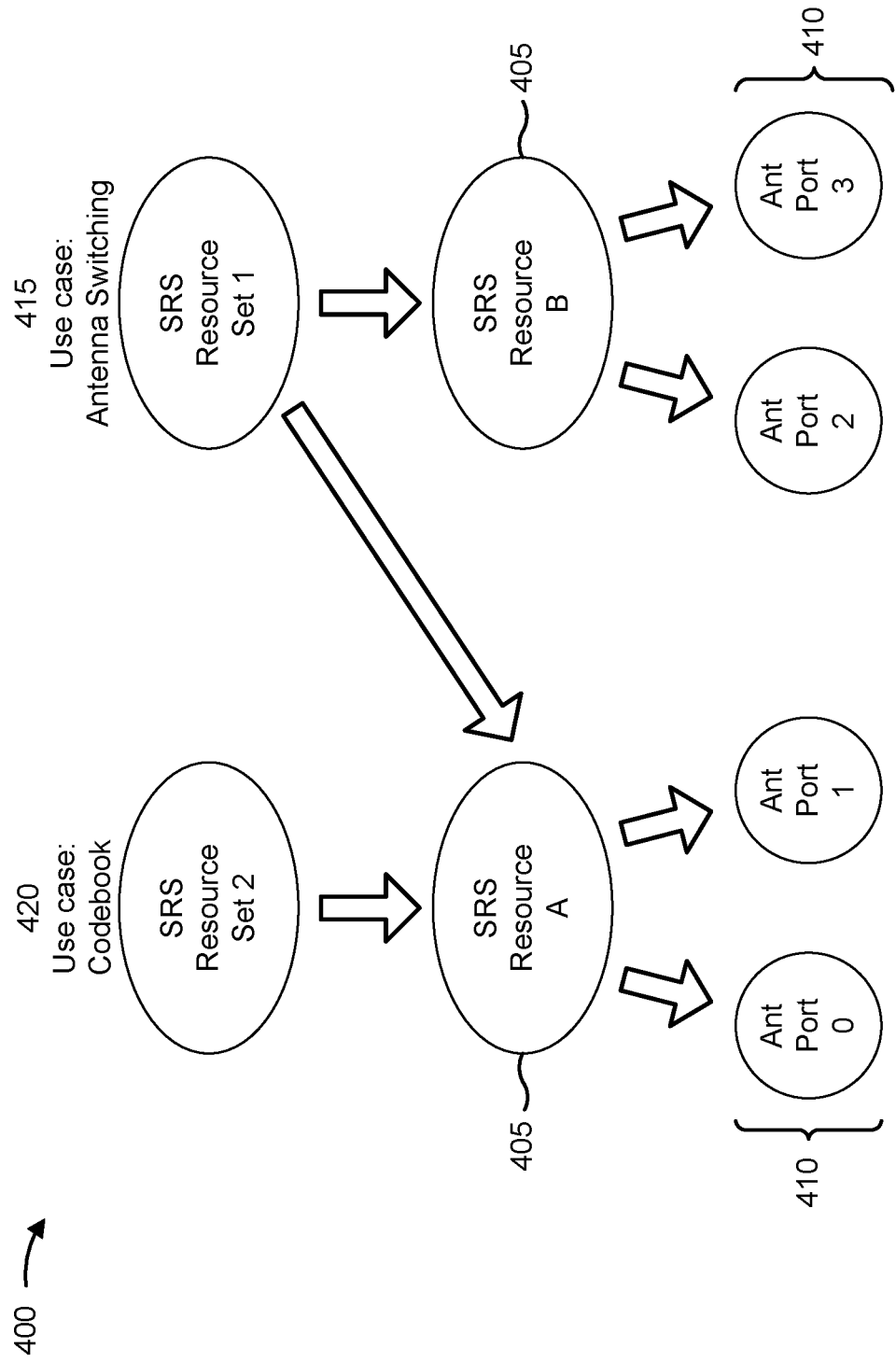
FIG. 4 is a diagram illustrating an example of sounding reference signal (SRS) resource sets, in accordance with the present disclosure.

FIG. 4 is a diagram illustrating an example 400 of SRS resource sets, in accordance with the present disclosure.

A base station may configure a UE 120 with one or more SRS resource sets to allocate resources for SRS transmissions by the UE 120. For example, a configuration for SRS resource sets may be indicated in an RRC message (e.g., an RRC configuration message or an RRC reconfiguration message). As shown by reference number 405, an SRS resource set may include one or more resources (e.g., shown as SRS resources), which may include time resources and/or frequency resources (e.g., a slot, a symbol, a resource block, and/or a periodicity for the time resources).

As shown by reference number 410, an SRS resource may include one or more antenna ports on which an SRS is to be transmitted (e.g., in a time-frequency resource). Thus, a configuration for an SRS resource set may indicate one or more time-frequency resources in which an SRS is to be transmitted and may indicate one or more antenna ports on which the SRS is to be transmitted in those time-frequency resources. In some aspects, the configuration for an SRS resource set may indicate a use case (e.g., in an SRS-SetUse information element) for the SRS resource set. For example, an SRS resource set may have a use case of antenna switching, codebook, non-codebook, or beam management, among other examples.

An antenna switching SRS resource set may be used to indicate downlink CSI with reciprocity between an uplink and downlink channel. For example, when there is reciprocity between an uplink channel and a downlink channel, a base station may use an antenna switching SRS (e.g., an SRS transmitted using a resource of an antenna switching SRS resource set) to acquire downlink CSI (e.g., to determine a downlink precoder to be used to communicate with the UE 120).

A codebook SRS resource set may be used to indicate uplink CSI when a base station indicates an uplink precoder to the UE 120. For example, when the base station is configured to indicate an uplink precoder to the UE 120 (e.g., using a precoder codebook), the base station may use a codebook SRS (e.g., an SRS transmitted using a resource of a codebook SRS resource set) to acquire uplink CSI (e.g., to determine an uplink precoder to be indicated to the UE 120 and used by the UE 120 to communicate with the base station). Virtual ports (e.g., a combination of two or more antenna ports) with a maximum transmit power may be supported at least for a codebook SRS.

A non-codebook SRS resource set may be used to indicate uplink CSI when the UE 120 selects an uplink precoder (e.g., instead of the base station indicated an uplink precoder to be used by the UE 120. For example, when the UE 120 is configured to select an uplink precoder, the base station may use a non-codebook SRS (e.g., an SRS transmitted using a resource of a non-codebook SRS resource set) to acquire uplink CSI. In this case, the non-codebook SRS may be precoded using a precoder selected by the UE 120 (e.g., which may be indicated to the base station).

A beam management SRS resource set may be used for indicating CSI for, for example, millimeter wave communications.

An SRS resource can be configured as periodic, semi-persistent (sometimes referred to as semi-persistent scheduling (SPS)), or aperiodic. A periodic SRS resource may be configured via a configuration message that indicates a periodicity of the SRS resource (e.g., a slot-level periodicity, where the SRS resources occurs every Y slots) and a slot offset. In some cases, a periodic SRS resource may always be activated (e.g., a periodic SRS resource may not be dynamically activated or deactivated). A semi-persistent SRS resource may also be configured via a configuration message that indicates a periodicity and a slot offset for the semi-persistent SRS resource, and may be dynamically activated and deactivated (e.g., using DCI or a medium access control (MAC) control element (CE) (MAC-CE)). An aperiodic SRS resource may be triggered dynamically, such as via DCI (e.g., UE-specific DCI or group common DCI) or a MAC-CE.

The UE 120 may be configured with a mapping between SRS ports (e.g., antenna ports) and corresponding SRS resources. The UE 120 may transmit an SRS on a particular SRS resource using an SRS port indicated in the configuration. In some aspects, an SRS resource may span N adjacent symbols within a slot (e.g., where N equals 1, 2, or 4). The UE 120 may be configured with X SRS ports (e.g., where X≤4). In some aspects, each of the X SRS ports may be mapped to a corresponding symbol of the SRS resource and used for transmission of an SRS in that symbol.

As shown in FIG. 4, in some aspects, different SRS resource sets indicated to the UE 120 (e.g., having different use cases) may overlap (e.g., in time and/or in frequency, such as in the same slot). For example, as shown by reference number 415, a first SRS resource set (e.g., shown as SRS Resource Set 1) is shown as having an antenna switching use case. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1 and may be transmitted in SRS Resource B (e.g., a second time-frequency resource) using antenna port 2 and antenna port 3.

As shown by reference number 420, a second SRS resource set (e.g., shown as SRS Resource Set 2) may be a codebook use case. As shown, this example codebook SRS resource set includes only the first SRS resource (shown as SRS Resource A). Thus, codebook SRSs may be transmitted in SRS Resource A (e.g., the first time-frequency resource) using antenna port 0 and antenna port 1. In this case, the UE 120 may not transmit codebook SRSs in SRS Resource B (e.g., the second time-frequency resource) using antenna port 2 and antenna port 3.

As indicated above, FIG. 4 is provided as an example. Other examples may differ from what is described with regard to FIG. 4.

As described above, a UE may receive RRC signaling and/or DCI signaling configuring SRS transmission. Different DCI formats may be possible to support configuration of SRS transmission (e.g., configuration of an SRS resource set) and/or triggering (e.g., activation) of SRS transmission (e.g., that was configured via RRC signaling). For example, a DCI format 2_3 may include a parameter for conveying a transmit power control (TPC) command for SRS transmission and a codepoint for triggering an aperiodic SRS transmission for an uplink cell. In this case, each codepoint in an SRS request of the DCI format 2_3 may correspond to an SRS resource set configured for the UE. Other DCI formats, such as DCI format 0_1 and DCI format 0_2 may include an SRS resource indicator (SRI) field that indicates, for codebook or non-codebook use cases, at least a portion of precoding information for a scheduled PUSCH. In 3GPP Release 15, a base station may configure a UE with a list of SRS resource sets via an RRC parameter, srs-ResourceSetToAddModList. In this case, the UE may receive DCI, such as DCI with DCI format 0_1, DCI format 1_1, or DCI format 2_3, that indicates an SRS resource set configured within the list of SRS resource sets.

In 3GPP Release 16, new DCI formats have been introduced, such as the aforementioned DCI format 0_2 and a DCI format 1_2 (which may each be termed "Compact DCI"), that support services, such as ultra-reliable low latency communication (URLLC). The compact DCI may support URLLC by having a smaller size than some other formats of DCI (e.g., DCI format 0_1 or DCI format 1_1). In this case, a compact DCI may have a configurable bitwidth for each field of the compact DCI, thereby enabling the compact DCI to use fewer bits than other types of DCI. With non-compact formats of DCI, RRC signaling may configure a first list of SRS resource sets, and DCI signaling may configure a second list of SRS resource sets. To enable compact DCI, RRC signaling may include a parameter, srs-ResourceSetToAddModListDCI0-2, which enables the RRC signaling to configure the second list of SRS resource sets. In other words, RRC signaling may include an RRC parameter srs-ResourceSetToAddModList and srs-ResourceSetToAddModListDCI-0-2, each of which may configure a list of SRS resource sets.

For each of the RRC configured use cases (e.g., codebook, non-codebook, beam management, or antenna switching, among other examples), DCI, including compact DCI, may be used to trigger aperiodic SRS transmission via an SRS request field of the DCI, if configured. In this case, the DCI may trigger use of an SRS resource set configured using the RRC signaling. However, when the UE receives RRC signaling, the UE may be configured with multiple different SRS resource sets configured with a particular value for a usage parameter. For example, the UE may be configured with two SRS resource sets in a corresponding list of SRS resource sets associated with the same usage parameter indicating a codebook usage or a non-codebook usage. Further, the two SRS resource sets may be associated with the same aperiodic SRS resource trigger parameter value (e.g., a parameter aperiodic SRS-Resource Trigger). As a result, when the UE receives an SRS request in certain DCI formats, such as DCI format 0_1, 1_1, 2_3, 0_2, or 1_2, among examples, the UE may not have information to resolve which of two configured SRS resource sets is being triggered via the SRS request.

Some aspects described herein enable a UE to identify an SRS resource set for SRS transmission based on receiving signaling identifying multiple configured SRS resource sets. For example, the UE may be configured with a mapping configuration that maps DCI formats to lists of SRS resource sets. In this case, the UE may select a list of SRS resource sets based at least in part on the DCI format of received DCI and the mapping configuration, thereby enabling the received DCI to indicate a single SRS resource set rather than two different SRS resource sets. In this way, the UE may select the same SRS resource set that the base station is triggering for the UE using the DCI, thereby avoiding synchronization issues, dropped communications, or inefficient use of network resources.

Figure 5:
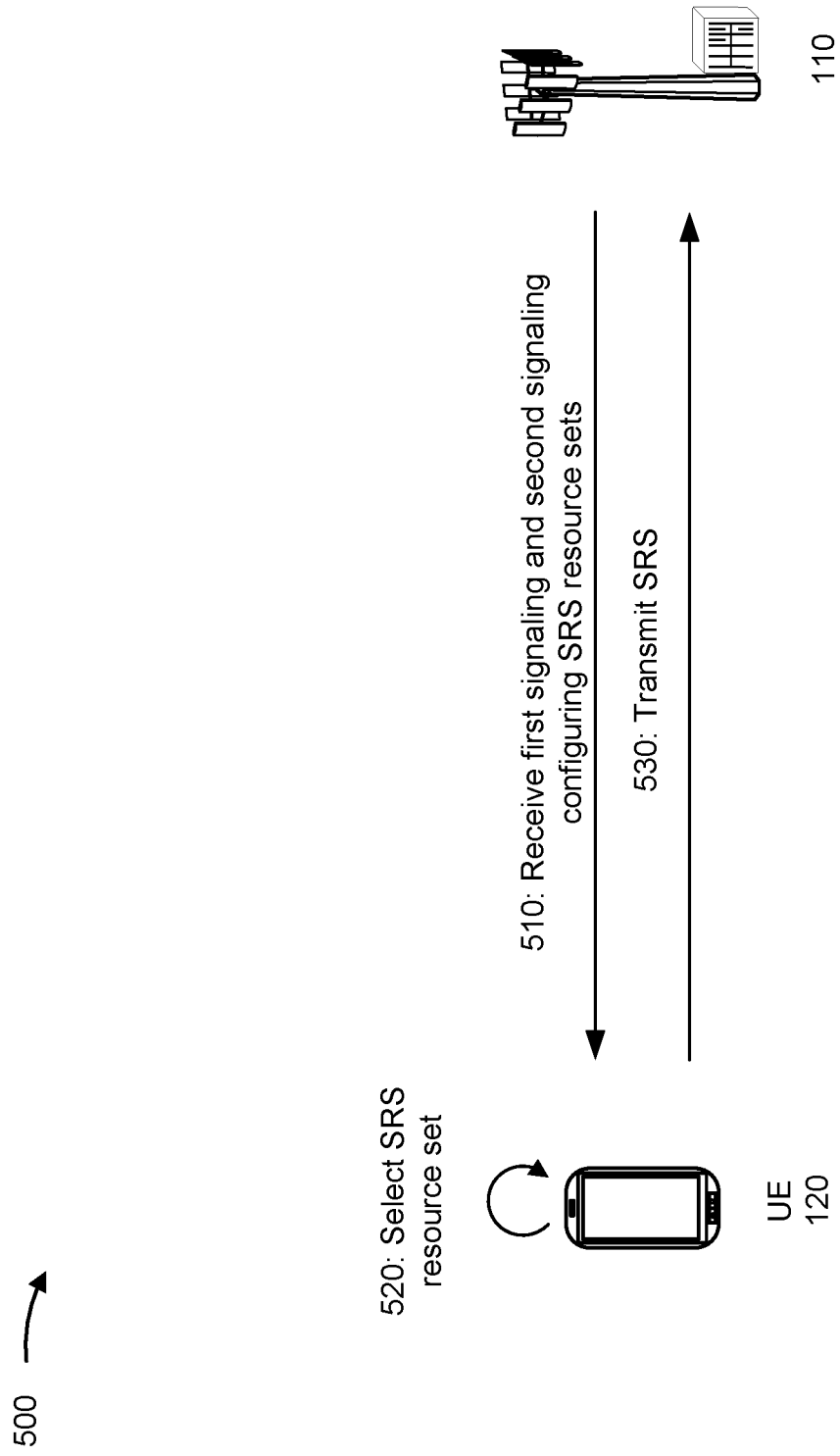
FIG. 5 is a diagram illustrating an example associated with SRS resource set determination for downlink control information, in accordance with the present disclosure.

FIG. 5 is a diagram illustrating an example 500 associated with SRS resource set determination for DCI, in accordance with the present disclosure. As shown in FIG. 5, example 500 includes communication between a base station 110 and a UE 120. In some aspects, base station 110 and UE 120 may be included in a wireless network, such as wireless network 100. The base station 110 and UE 120 may communicate via a wireless access link, which may include an uplink and a downlink.

As further shown in FIG. 5, and by reference numbers 510 and 520, UE 120 may receive first signaling and second signaling configuring SRS resource sets and may select an SRS resource set for transmitting an SRS. For example, UE 120 may receive, as first signaling, RRC signaling with a set of RRC parameters configuring one or more sets of SRS resource set lists. Additionally, or alternatively, UE 120 may receive second signaling via DCI that configures an SRS resource set, triggers an SRS resource set, or triggers SRS transmission using an SRS resource set, among other examples In some aspects, UE 120 may receive an srs-ResourceSetToAddModList parameter configuring a first list of SRS resource sets and an srs-resourceSetToAddMostListDCI-0-2 parameter configuring a second list of SRS resource sets and may identify or determine an SRS resource set based at least in part on a format of DCI used to trigger SRS transmission and/or a mapping configuration. The mapping configuration may be a rule for mapping an association between DCI formats and SRS resource sets, such as a rule configured by base station 110 for UE 120, a rule that is hard-coded and/or stored by UE 120, or a rule that is defined in a specification for UE 120, among other examples. For example, UE 120 may receive DCI, with a DCI format 0_1, 1_1, or 2_3, associated with conveying an SRS request, and UE 120 may identify an SRS resource set for SRS transmission (e.g., an SRSResourceSet parameter) from a list of SRS resource sets associated with the srs-ResourceSetToAddModList parameter. Alternatively, UE 120 may receive DCI, with a DCI format 0_2 or 1_2, associated with conveying an SRS request, and UE 120 may identify an SRS resource set for SRS transmission from a list of SRS resource sets associated with the srs-ResourceSetToAddModListDCI-0-2 parameter.

Additionally, or alternatively, UE 120 may receive DCI, with a DCI format 2_3, and may identify an SRS resource set based at least in part on which parameters were configured in the RRC signaling. For example, when an srs-ResourceSetToAddModList parameter is configured in the RRC signaling for the UE 120, UE 120 may select the SRS resource set from a list of SRS resource sets configured by the srs-ResourceSetToAddModList parameter. Alternatively, when the srs-ResourceSetToAddModList parameter is not configured in the RRC signaling, but an srs-ResourceSetToAddModListDCI-0-2 parameter is configured, UE 120 may select the SRS resource set from a list of SRS resource sets configured by the srs-ResourceSetToAddModListDCI-0-2 parameter.

Similarly, UE 120 may receive DCI, with a DCI format 1_2, and the UE 120 may identify an SRS resource set based at least in part on which parameters were configured in the RRC signaling. For example, when an srs-ResourceSetToAddModListDCI-0-2 parameter is configured in the RRC signaling for the UE 120, UE 120 may select the SRS resource set from a list of SRS resource sets configured by the srs-ResourceSetToAddModListDCI-0-2 parameter. Alternatively, when the srs-ResourceSetToAddModListDCI-0-2 parameter is not configured in the RRC signaling, but an srs-ResourceSetToAddModList parameter is configured, UE 120 may select the SRS resource set from a list of SRS resource sets configured by the srs-ResourceSetToAddModList parameter.

As further shown in FIG. 5, and by reference number 530, UE 120 may transmit an SRS using a selected SRS resource set. For example, UE 120 may transmit an SRS selected from an SRS resource set associated with a first SRS resource set list (e.g., an SRS resource set list configured by an srs-ResourceSetToAddModList parameter) or an SRS resource set associated with a second SRS resource set list (e.g., an SRS resource set list configured by an srs-ResourceSetToAddModListDCI0-2 parameter). In this case, the base station 110 may use the SRS for a codebook usage, a non-codebook usage, an antenna switching usage, or a beam management usage, among other examples.

As indicated above, FIG. 5 is provided as an example. Other examples may differ from what is described with respect to FIG. 5.

Figure 6:
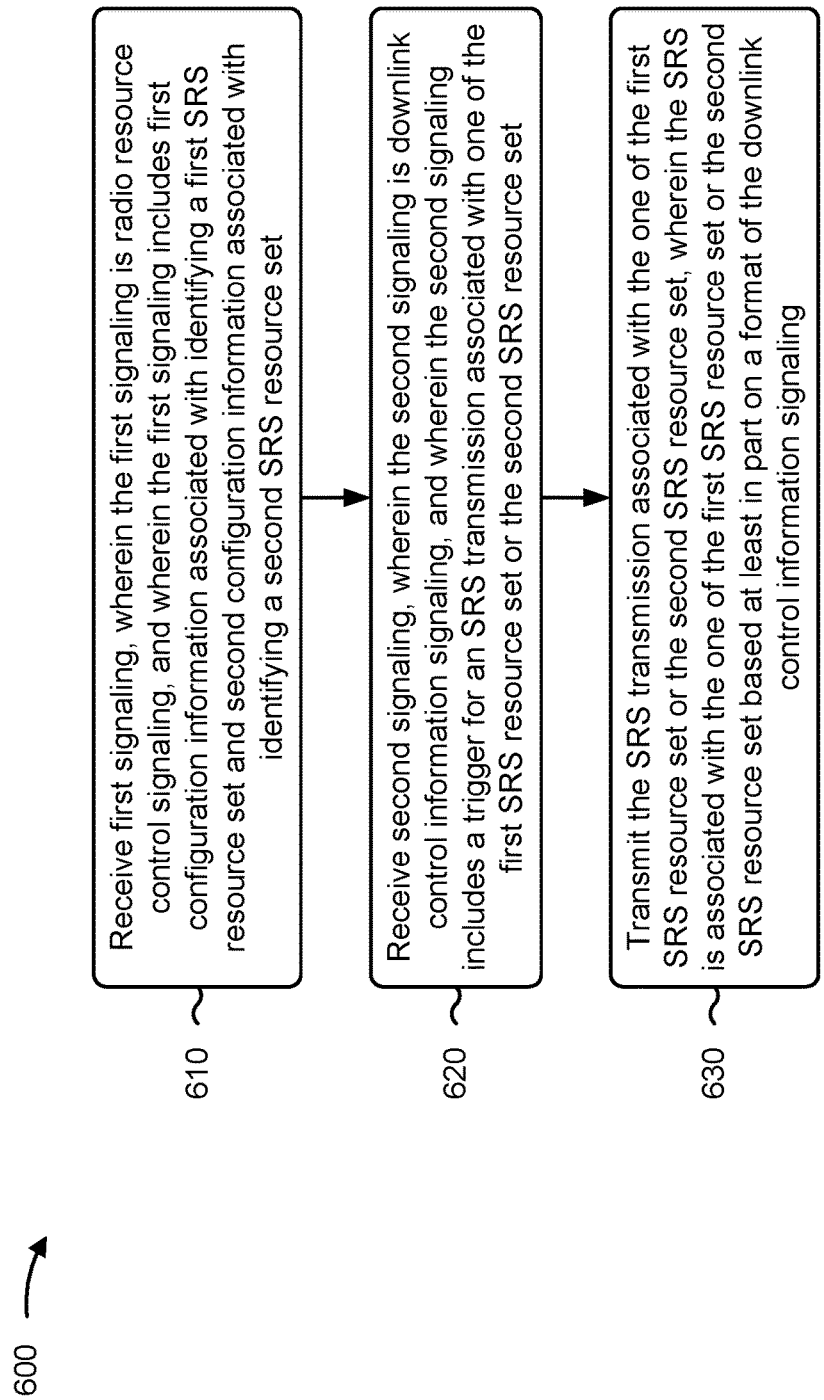
FIGS. 6-7 are diagrams illustrating example processes associated with SRS resource set determination for downlink control information, in accordance with the present disclosure.

FIG. 6 is a diagram illustrating an example process 600 performed, for example, by a UE, in accordance with the present disclosure. Example process 600 is an example where the UE (e.g., UE 120) performs operations associated with SRS resource set determination for DCI.

As shown in FIG. 6, in some aspects, process 600 may include receiving first signaling, wherein the first signaling is radio resource control signaling, and wherein the first signaling includes first configuration information associated with identifying a first SRS resource set and second configuration information associated with identifying a second SRS resource set (block 610). For example, the UE (e.g., using communication manager 140 and/or reception component 802, depicted in FIG. 8) may receive first signaling, wherein the first signaling is radio resource control signaling, and wherein the first signaling includes first configuration information associated with identifying a first SRS resource set and second configuration information associated with identifying a second SRS resource set, as described above.

As shown in FIG. 6, in some aspects, process 600 may include receiving second signaling, wherein the second signaling is downlink control information signaling, and wherein the second signaling includes a trigger for an SRS transmission associated with one of the first SRS resource set or the second SRS resource set (block 620). For example, the UE (e.g., using communication manager 140 and/or reception component 802, depicted in FIG. 8) may receive second signaling, wherein the second signaling is downlink control information signaling, and wherein the second signaling includes a trigger for an SRS transmission associated with one of the first SRS resource set or the second SRS resource set, as described above.

As further shown in FIG. 6, in some aspects, process 600 may include transmitting the SRS transmission associated with the one of the first SRS resource set or the second SRS resource set, wherein the SRS is associated with the one of the first SRS resource set or the second SRS resource set based at least in part on a format of the downlink control information signaling (block 630). For example, the UE (e.g., using communication manager 140 and/or transmission component 804, depicted in FIG. 8) may transmit the SRS transmission associated with the one of the first SRS resource set or the second SRS resource set, wherein the SRS is associated with the one of the first SRS resource set or the second SRS resource set based at least in part on a format of the downlink control information signaling, as described above.

Process 600 may include additional aspects, such as any single aspect or any combination of aspects described below and/or in connection with one or more other processes described elsewhere herein.

In a first aspect, the downlink control information signaling is associated with a format 01, format 1_1, format 2_3, format 0_2, or format 1_2.

In a second aspect, alone or in combination with the first aspect, the first configuration information is associated with a first list of SRS resource sets and the second configuration information is associated a second list of SRS resource sets.

In a third aspect, alone or in combination with one or more of the first and second aspects, process 600 includes selecting the one of the first SRS resource set or the second SRS resource set based at least in part on the format of the downlink control information signaling and the mapping configuration.

In a fourth aspect, alone or in combination with one or more of the first through third aspects, the downlink control information signaling is associated with one of formats 0_1, 1_1, or 2_3, wherein the mapping configuration maps the formats 0_1, 1_1, and 2_3 to an srs-ResourceSetToAddModList parameter, and wherein selecting the one of the first SRS resource set or the second SRS resource set comprises selecting the one of the first SRS resource set or the second SRS resource set that is included in the srs-ResourceSetToAddModList parameter.

In a fifth aspect, alone or in combination with one or more of the first through fourth aspects, the downlink control information signaling is associated with one of formats 0_2 or 1_2, wherein the mapping configuration maps the formats 0_2 and 1_2 to an srs-ResourceSetToAddModListDCI-0-2 parameter, and wherein selecting the one of the first SRS resource set or the second SRS resource set comprises selecting the one of the first SRS resource set or the second SRS resource set that is included in the srs-ResourceSetToAddModListDCI-0-2 parameter.

In a sixth aspect, alone or in combination with one or more of the first through fifth aspects, the downlink control information signaling is associated with a format 2_3, and wherein selecting the one of the first SRS resource set or the second SRS resource set comprises selecting the one of the first SRS resource set or the second SRS resource set based at least in part on whether the first signaling or the second signaling configures the first configuration information.

In a seventh aspect, alone or in combination with one or more of the first through sixth aspects, the one of the first SRS resource set or the second SRS resource set is the first SRS resource set based at least in part on the first configuration information configuring the first SRS resource set.

In an eighth aspect, alone or in combination with one or more of the first through seventh aspects, the one of the first SRS resource set or the second SRS resource set is the second SRS resource set based at least in part on the first configuration information not configuring the first SRS resource set and the second configuration information configuring the second SRS resource set.

In a ninth aspect, alone or in combination with one or more of the first through eighth aspects, the downlink control information signaling is associated with a format 1_2, and wherein selecting the one of the first SRS resource set or the second SRS resource set comprises selecting the one of the first SRS resource set or the second SRS resource set based at least in part on whether the first signaling or the second signaling configures the second configuration information.

In a tenth aspect, alone or in combination with one or more of the first through ninth aspects, the one of the first SRS resource set or the second SRS resource set is the second SRS resource set based at least in part on the second configuration information configuring the second SRS resource set.

In an eleventh aspect, alone or in combination with one or more of the first through tenth aspects, the one of the first SRS resource set or the second SRS resource set is the first SRS resource set based at least in part on the second configuration information not configuring the second SRS resource set and the first configuration information configuring the first SRS resource set.

In a twelfth aspect, alone or in combination with one or more of the first through eleventh aspects, process 600 includes determining whether to use the first SRS resource set or the second SRS resource set based at least in part on the format of the downlink control information signaling; and using the first SRS resource set or the second SRS resource set for the SRS transmission based at least in part on determining whether to use the first SRS resource set or the second SRS resource set.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
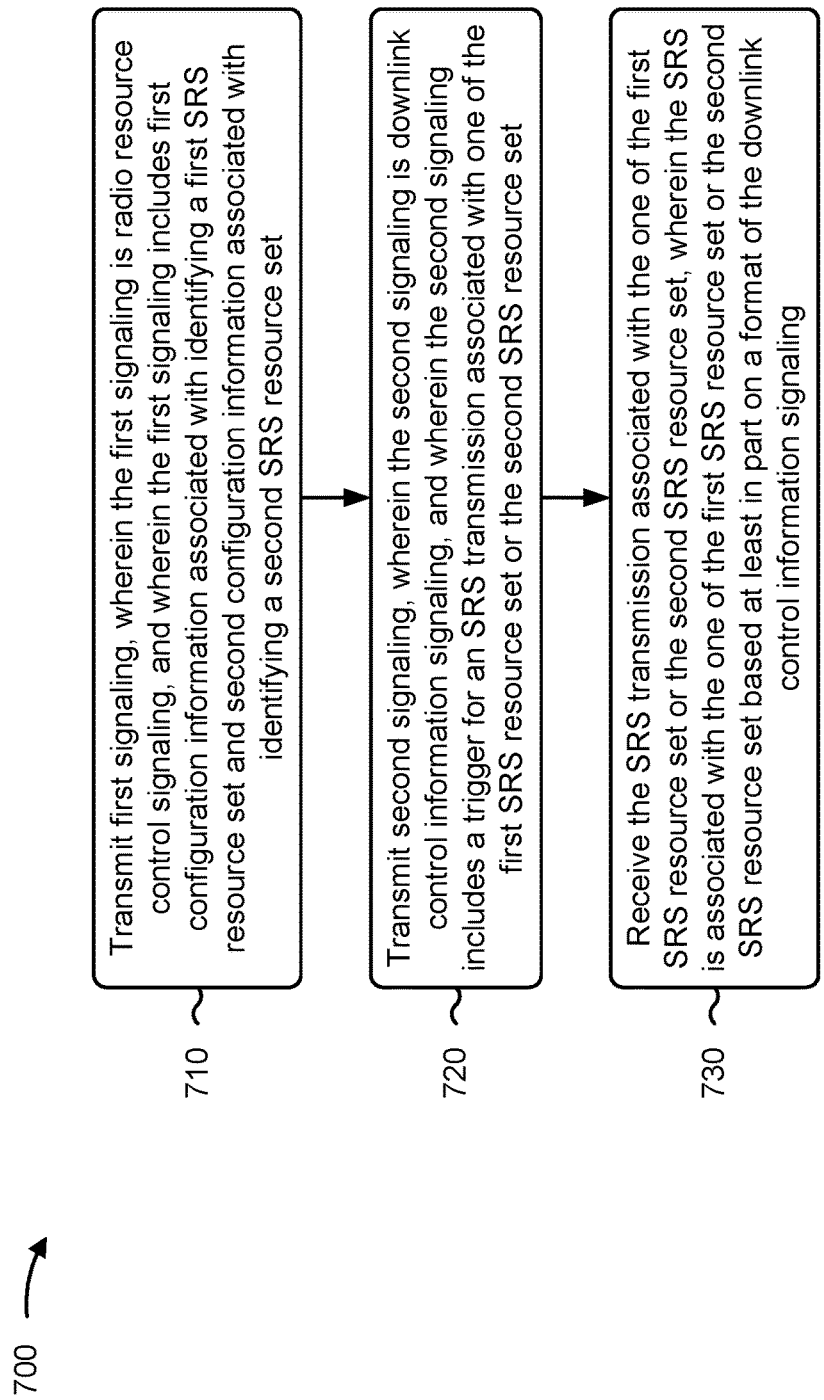

FIG. 7 is a diagram illustrating an example process 700 performed, for example, by a base station, in accordance with the present disclosure. Example process 700 is an example where the base station (e.g., base station 110) performs operations associated with SRS resource set determination for downlink control information.

As shown in FIG. 7, in some aspects, process 700 may include transmitting first signaling, wherein the first signaling is radio resource control signaling, and wherein the first signaling includes first configuration information associated with identifying a first SRS resource set and second configuration information associated with identifying a second SRS resource set (block 710). For example, the base station (e.g., using communication manager 150 and/or transmission component 904, depicted in FIG. 9) may transmit first signaling, wherein the first signaling is radio resource control signaling, and wherein the first signaling includes first configuration information associated with identifying a first SRS resource set and second configuration information associated with identifying a second SRS resource set, as described above.

As shown in FIG. 7, in some aspects, process 700 may include transmitting second signaling, wherein the second signaling is downlink control information signaling, and wherein the second signaling includes a trigger for an SRS transmission associated with one of the first SRS resource set or the second SRS resource set (block 720). For example, the base station (e.g., using communication manager 150 and/or transmission component 904, depicted in FIG. 9) may transmit second signaling, wherein the second signaling is downlink control information signaling, and wherein the second signaling includes a trigger for an SRS transmission associated with one of the first SRS resource set or the second SRS resource set, as described above.

As further shown in FIG. 7, in some aspects, process 700 may include receiving the SRS transmission associated with the one of the first SRS resource set or the second SRS resource set, wherein the SRS is associated with the one of the first SRS resource set or the second SRS resource set based at least in part on a format of the downlink control information signaling (block 730). For example, the base station (e.g., using communication manager 150 and/or reception component 902, depicted in FIG. 9) may receive the SRS transmission associated with the one of the first SRS resource set or the second SRS resource set, wherein the SRS is associated with the one of the first SRS resource set or the second SRS resource set based at least in part on a format of the downlink control information signaling, as described above.

Process 700 may include additional aspects, such as any single aspect or any combination of aspects described below and/or in connection with one or more other processes described elsewhere herein.

In a first aspect, the downlink control information signaling is associated with a format 01, format 11, format 23, format 0_2, or format 1_2.

In a second aspect, alone or in combination with the first aspect, the first configuration information is associated with a first list of SRS resource sets and the second configuration information is associated a second list of SRS resource sets.

In a third aspect, alone or in combination with one or more of the first and second aspects, process 700 includes the one of the first SRS resource set or the second SRS resource set is based at least in part on the format of the downlink control information signaling and the mapping configuration.

In a fourth aspect, alone or in combination with one or more of the first through third aspects, the downlink control information signaling is associated with one of formats 0_1, 1_1, or 2_3, wherein the mapping configuration maps the formats 0_1, 1_1, and 2_3 to an srs-ResourceSetToAdd-ModList parameter, and wherein the one of the first SRS resource set or the second SRS resource set that is included in the srs-ResourceSetToAddModList parameter is selected.

In a fifth aspect, alone or in combination with one or more of the first through fourth aspects, the downlink control information signaling is associated with one of formats 0_2 or 1_2, wherein the mapping configuration maps the formats 0_2 and 1_2 to an srs-ResourceSetToAddModListDCI-0-2 parameter, and wherein the one of the first SRS resource set or the second SRS resource set that is included in the srs-ResourceSetToAddModListDCI-0-2 parameter is selected.

In a sixth aspect, alone or in combination with one or more of the first through fifth aspects, the downlink control information signaling is associated with a format 2_3, and wherein the one of the first SRS resource set or the second SRS resource set is selected based at least in part on whether the first signaling or the second signaling configures the first configuration information.

In a seventh aspect, alone or in combination with one or more of the first through sixth aspects, the one of the first SRS resource set or the second SRS resource set is the first SRS resource set based at least in part on the first configuration information configuring the first SRS resource set.

In an eighth aspect, alone or in combination with one or more of the first through seventh aspects, the one of the first SRS resource set or the second SRS resource set is the second SRS resource set based at least in part on the first configuration information not configuring the first SRS resource set and the second configuration information configuring the second SRS resource set.

In a ninth aspect, alone or in combination with one or more of the first through eighth aspects, the downlink control information signaling is associated with a format 1_2, and wherein the one of the first SRS resource set or the second SRS resource set is selected based at least in part on whether the first signaling or the second signaling configures the second configuration information.

In a tenth aspect, alone or in combination with one or more of the first through ninth aspects, the one of the first SRS resource set or the second SRS resource set is the second SRS resource set based at least in part on the second configuration information configuring the second SRS resource set.

In an eleventh aspect, alone or in combination with one or more of the first through tenth aspects, the one of the first SRS resource set or the second SRS resource set is the first SRS resource set based at least in part on the second configuration information not configuring the second SRS resource set and the first configuration information configuring the first SRS resource set.

In a twelfth aspect, alone or in combination with one or more of the first through eleventh aspects, process 700 includes setting the format of the downlink control information signaling to indicate whether to use the first SRS resource set or the second SRS resource set; and using the first SRS resource set or the second SRS resource set for receiving the SRS transmission based at least in part on setting the format of the downlink control information signaling.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
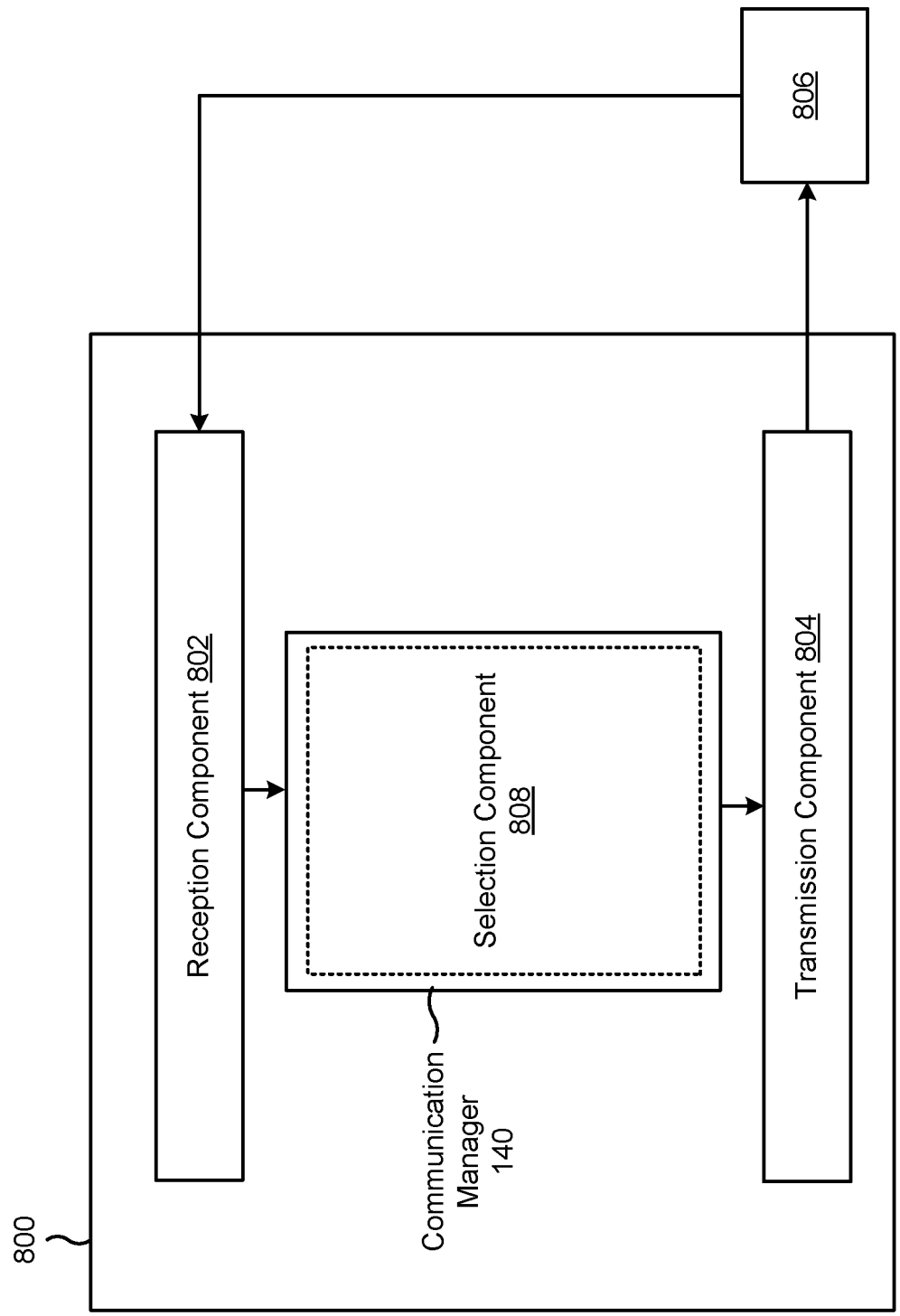
FIGS. 8-9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a selection component 808, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receiving first signaling, wherein the first signaling is radio resource control signaling, and wherein the first signaling includes first configuration information associated with identifying a first sounding reference signal (SRS) resource set and second configuration information associated with identifying a second SRS resource set. The reception component 802 may receive second signaling, wherein the second signaling is downlink control information signaling, and wherein the second signaling includes a trigger for an SRS transmission associated with one of the first SRS resource set or the second SRS resource set. The transmission component 804 may transmit the SRS transmission associated with the one of the first SRS resource set or the second SRS resource set, wherein the SRS is associated with the one of the first SRS resource set or the second SRS resource set based at least in part on a format of the downlink control information signaling.

The selection component 808 may select the one of the first SRS resource set or the second SRS resource set based at least in part on the format of the downlink control information and the mapping configuration.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
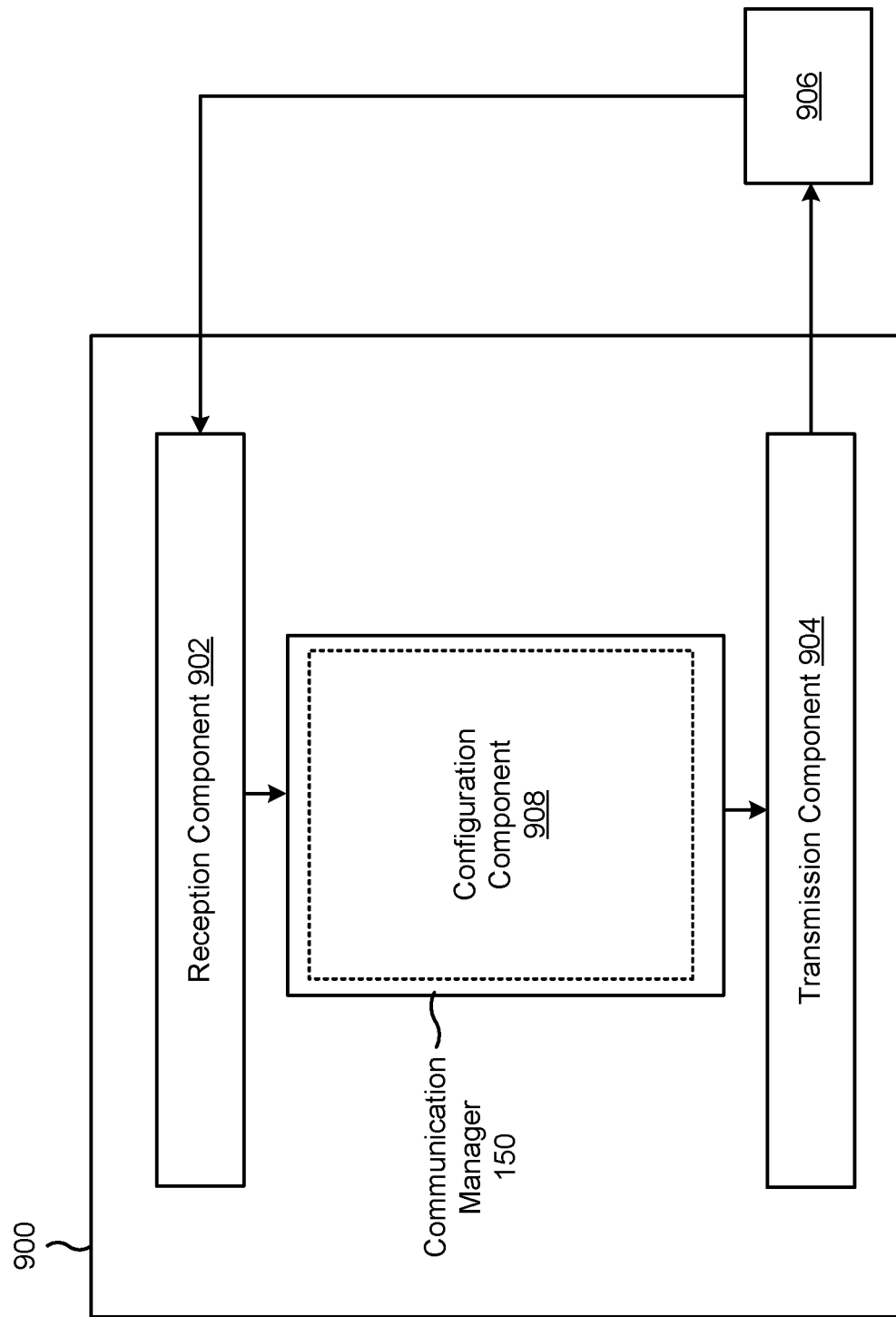

FIG. 9 is a diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include a configuration component 908, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 may transmit first signaling, wherein the first signaling is radio resource control signaling, and wherein the first signaling includes first configuration information associated with identifying a first SRS resource set and second configuration information associated with identifying a second SRS resource set. The transmission component 904 may transmit second signaling, wherein the second signaling is downlink control information signaling, and wherein the second signaling includes a trigger for an SRS transmission associated with one of the first SRS resource set or the second SRS resource set. The reception component 902 may receive the SRS transmission associated with the one of the first SRS resource set or the second SRS resource set, wherein the SRS is associated with the one of the first SRS resource set or the second SRS resource set based at least in part on a format of the downlink control information signaling. The configuration component 908 may determine a configuration for an SRS resource set for the apparatus 906.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving first signaling, wherein the first signaling is radio resource control signaling, and wherein the first signaling includes first configuration information associated with identifying a first sounding reference signal (SRS) resource set and second configuration information associated with identifying a second SRS resource set; receiving second signaling, wherein the second signaling is downlink control information signaling, and wherein the second signaling includes a trigger for an SRS transmission associated with one of the first SRS resource set or the second SRS resource set; and transmitting the SRS transmission associated with the one of the first SRS resource set or the second SRS resource set, wherein the SRS is associated with the one of the first SRS resource set or the second SRS resource set based at least in part on a format of the downlink control information signaling.

Aspect 2: The method of Aspect 1, wherein the downlink control information signaling is associated with a format 0_1, format 1_1, format 2_3, format 0_2, or format 1_2.

Aspect 3: The method of Aspect 1, wherein the first configuration information is associated with a first list of SRS resource sets and the second configuration information is associated a second list of SRS resource sets.

Aspect 4: The method of Aspect 1, further comprising: selecting the one of the first SRS resource set or the second SRS resource set based at least in part on the format of the downlink control information signaling and the mapping configuration.

Aspect 5: The method of Aspect 4, wherein the downlink control information signaling is associated with one of formats 0_1, 1_1, or 2_3, wherein the mapping configuration maps the formats 0_1, 1_1, and 2_3 to an srs-ResourceSetToAddModList parameter, and wherein selecting the one of the first SRS resource set or the second SRS resource set comprises: selecting the one of the first SRS resource set or the second SRS resource set that is included in the srs-ResourceSetToAddModList parameter.

Aspect 6: The method of Aspect 4, wherein the downlink control information signaling is associated with one of formats 0_2 or 1_2, wherein the mapping configuration maps the formats 0_2 and 1_2 to an srs-ResourceSetToAddModListDCI-0-2 parameter, and wherein selecting the one of the first SRS resource set or the second SRS resource set comprises: selecting the one of the first SRS resource set or the second SRS resource set that is included in the srs-ResourceSetToAddModListDCI-0-2 parameter.

Aspect 7: The method of Aspect 4, wherein the downlink control information signaling is associated with a format 2_3, and wherein selecting the one of the first SRS resource set or the second SRS resource set comprises: selecting the one of the first SRS resource set or the second SRS resource set based at least in part on whether the first signaling or the second signaling configures the first configuration information.

Aspect 8: The method of Aspect 7, wherein the one of the first SRS resource set or the second SRS resource set is the first SRS resource set based at least in part on the first configuration information configuring the first SRS resource set.

Aspect 9: The method of Aspect 7, wherein the one of the first SRS resource set or the second SRS resource set is the second SRS resource set based at least in part on the first configuration information not configuring the first SRS resource set and the second configuration information configuring the second SRS resource set.

Aspect 10: The method of any of Aspects 4 to 10, wherein the downlink control information signaling is associated with a format 1_2, and wherein selecting the one of the first SRS resource set or the second SRS resource set comprises: selecting the one of the first SRS resource set or the second SRS resource set based at least in part on whether the first signaling or the second signaling configures the second configuration information.

Aspect 11: The method of Aspect 10, wherein the one of the first SRS resource set or the second SRS resource set is the second SRS resource set based at least in part on the second configuration information configuring the second SRS resource set.

Aspect 12: The method of Aspect 10, wherein the one of the first SRS resource set or the second SRS resource set is the first SRS resource set based at least in part on the second configuration information not configuring the second SRS resource set and the first configuration information configuring the first SRS resource set.

Aspect 13: The method of any of Aspects 1 to 12, further comprising: determining whether to use the first SRS resource set or the second SRS resource set based at least in part on the format of the downlink control information signaling; and use the first SRS resource set or the second SRS resource set for the SRS transmission based at least in part on determining whether to use the first SRS resource set or the second SRS resource set.

Aspect 14: A method of wireless communication performed by a base station, comprising: transmitting first signaling, wherein the first signaling is radio resource control signaling, and wherein the first signaling includes first configuration information associated with identifying a first sounding reference signal (SRS) resource set and second configuration information associated with identifying a second SRS resource set; transmitting second signaling, wherein the second signaling is downlink control information signaling, and wherein the second signaling includes a trigger for an SRS transmission associated with one of the first SRS resource set or the second SRS resource set; and receiving the SRS transmission associated with the one of the first SRS resource set or the second SRS resource set, wherein the SRS is associated with the one of the first SRS resource set or the second SRS resource set based at least in part on a format of the downlink control information signaling.

Aspect 15: The method of Aspect 14, wherein the downlink control information signaling is associated with a format 0_1, format 1_1, format 2_3, format 0_2, or format 1_2.

Aspect 16: The method of any of Aspects 14 to 15, wherein the first configuration information is associated with a first list of SRS resource sets and the second configuration information is associated a second list of SRS resource sets.

Aspect 17: The method of any of Aspects 14 to 16, wherein the one of the first SRS resource set or the second SRS resource set is based at least in part on the format of the downlink control information signaling and the mapping configuration.

Aspect 18: The method of Aspect 17, wherein the downlink control information signaling is associated with one of formats 0_1, 1_1, or 2_3, wherein the mapping configuration maps the formats 0_1, 1_1, and 2_3 to an srs-ResourceSetToAddModList parameter, and wherein the one of the first SRS resource set or the second SRS resource set that is included in the srs-ResourceSetToAddModList parameter is selected.

Aspect 19: The method of any of Aspects 17 to 18, wherein the downlink control information signaling is associated with one of formats 0_2 or 1_2, wherein the mapping configuration maps the formats 0_2 and 1_2 to an srs-ResourceSetToAddModListDCI-0-2 parameter, and wherein the one of the first SRS resource set or the second SRS resource set that is included in the srs-ResourceSetToAddModListDCI-0-2 parameter is selected.

Aspect 20: The method of any of Aspects 17 to 19, wherein the downlink control information signaling is associated with a format 2_3, and wherein the one of the first SRS resource set or the second SRS resource set is selected based at least in part on whether the first signaling or the second signaling configures the first configuration information.

Aspect 21: The method of Aspect 20, wherein the one of the first SRS resource set or the second SRS resource set is the first SRS resource set based at least in part on the first configuration information configuring the first SRS resource set.

Aspect 22: The method of any of Aspects 20 to 21, wherein the one of the first SRS resource set or the second SRS resource set is the second SRS resource set based at least in part on the first configuration information not configuring the first SRS resource set and the second configuration information configuring the second SRS resource set.

Aspect 23: The method of any of Aspects 17 to 22, wherein the downlink control information signaling is associated with a format 1_2, and wherein the one of the first SRS resource set or the second SRS resource set is selected based at least in part on whether the first signaling or the second signaling configures the second configuration information.

Aspect 24: The method of Aspect 23, wherein the one of the first SRS resource set or the second SRS resource set is the second SRS resource set based at least in part on the second configuration information configuring the second SRS resource set.

Aspect 25: The method of any of Aspects 23 to 24, wherein the one of the first SRS resource set or the second SRS resource set is the first SRS resource set based at least in part on the second configuration information not configuring the second SRS resource set and the first configuration information configuring the first SRS resource set.

Aspect 26: The method of any of Aspects 14 to 25, further comprising: setting the format of the downlink control information signaling to indicate whether to use the first SRS resource set or the second SRS resource set; and using the first SRS resource set or the second SRS resource set for receiving the SRS transmission based at least in part on setting the format of the downlink control information signaling.

Aspect 27: An apparatus for wireless communication at a device, comprising a processor; memory coupled with the processor; and instructions stored in the memory and executable by the processor to cause the apparatus to perform the method of one or more of Aspects 1-13.

Aspect 28: A device for wireless communication, comprising a memory and one or more processors coupled to the memory, the one or more processors configured to perform the method of one or more of Aspects 1-13.

Aspect 29: An apparatus for wireless communication, comprising at least one means for performing the method of one or more of Aspects 1-13.

Aspect 30: A non-transitory computer-readable medium storing code for wireless communication, the code comprising instructions executable by a processor to perform the method of one or more of Aspects 1-13.

Aspect 31: A non-transitory computer-readable medium storing a set of instructions for wireless communication, the set of instructions comprising one or more instructions that, when executed by one or more processors of a device, cause the device to perform the method of one or more of Aspects 1-13.

Aspect 32: An apparatus for wireless communication at a device, comprising a processor; memory coupled with the processor; and instructions stored in the memory and executable by the processor to cause the apparatus to perform the method of one or more of Aspects 14-26.

Aspect 33: A device for wireless communication, comprising a memory and one or more processors coupled to the memory, the one or more processors configured to perform the method of one or more of Aspects 14-26.

Aspect 34: An apparatus for wireless communication, comprising at least one means for performing the method of one or more of Aspects 14-26.

Aspect 35: A non-transitory computer-readable medium storing code for wireless communication, the code comprising instructions executable by a processor to perform the method of one or more of Aspects 14-26.

Aspect 36: A non-transitory computer-readable medium storing a set of instructions for wireless communication, the set of instructions comprising one or more instructions that, when executed by one or more processors of a device, cause the device to perform the method of one or more of Aspects 14-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
receive first signaling including:
first configuration information associated with identifying a first sounding reference signal (SRS) resource set of a plurality of SRS resource sets, and
second configuration information associated with identifying a second SRS resource set of the plurality of SRS resource sets;
receive second signaling including a trigger for an SRS transmission associated with a particular SRS resource set of the plurality of SRS resource sets, the particular SRS resource set being one of the first SRS resource set or the second SRS resource set selected according to a downlink control information (DCI) format of the second signaling; and
transmit the SRS transmission associated with the particular SRS resource set.

2. The UE of claim 1, wherein the one or more processors are further configured to:
determine whether to use the first SRS resource set or the second SRS resource set based at least in part on the DCI format; and
use the first SRS resource set or the second SRS resource set for the SRS transmission based at least in part on determining whether to use the first SRS resource set or the second SRS resource set.

3. The UE of claim 1, wherein the second signaling is downlink control information signaling associated with a format 2_3.

4. The UE of claim 3, wherein the particular SRS resource set is the second SRS resource set based at least in part on the first configuration information configuring the first SRS resource set and the second configuration information configuring the second SRS resource set.

5. The UE of claim 3, wherein the second signaling maps to an srs-ResourceSetToAddModList parameter, and wherein the one or more processors are further configured to:
select the one of the first SRS resource set or the second SRS resource set that is included in the srs-ResourceSetToAddModList parameter as the particular SRS resource set.

6. The UE of claim 3, wherein the second signaling corresponds to an srs-ResourceSetToAddModList parameter,
wherein the particular SRS resource set is the second SRS resource set based at least in part on the first configuration information, the second configuration information, and the srs-ResourceSetToAddModList parameter.

7. The UE of claim 1, wherein the first configuration information is associated with a first list of SRS resource sets and the second configuration information is associated a second list of SRS resource sets.

8. The UE of claim 1, wherein the one or more processors are further configured to:
select the one of the first SRS resource set or the second SRS resource set based at least in part on the DCI format and a mapping configuration.

9. The UE of claim 8, wherein the mapping configuration includes:
an srs-ResourceSetToAddModListDCI-0-2 parameter when the second signaling is associated with one of formats 0_2 or 1_2, or
an srs-ResourceSetToAddModList parameter when the second signaling is associated with one of formats 0_1, 1_1, or 2_3.

10. The UE of claim 8, wherein the second signaling is associated with one of formats 0_1 or 1_1, wherein the mapping configuration maps the formats 0_1 and 1_1 to an srs-ResourceSetToAddModList parameter, and
wherein the one or more processors, to select the one of the first SRS resource set or the second SRS resource set, are configured to:
select the one of the first SRS resource set or the second SRS resource set that is included in the srs-ResourceSetToAddModList parameter.

11. The UE of claim 8, wherein the second signaling is associated with one of formats 0_2 or 1_2, wherein the mapping configuration maps the formats 0_2 and 1_2 to an srs-ResourceSetToAddModListDCI-0-2 parameter, and
wherein the one or more processors, to select the one of the first SRS resource set or the second SRS resource set, are configured to:
select the one of the first SRS resource set or the second SRS resource set that is included in the srs-ResourceSetToAddModListDCI-0-2 parameter.

12. A base station for wireless communication, comprising:
a memory; and
one or more processors, coupled to the memory, configured to:
transmit first signaling including:
first configuration information associated with identifying a first sounding reference signal (SRS) resource set of a plurality of SRS resource sets, and
second configuration information associated with identifying a second SRS resource set of the plurality of SRS resource sets;
transmit second signaling including a trigger for an SRS transmission associated with a particular SRS resource set of the plurality of SRS resource sets, the particular SRS resource set being one of the first SRS resource set or the second SRS resource set selected according to a downlink control information format of the second signaling; and receive the SRS transmission associated with the particular SRS resource set.

13. The base station of claim 12, wherein the SRS transmission is an aperiodic SRS transmission.

14. The base station of claim 12, wherein the one or more processors are further configured to:
set the DCI format to indicate whether to use the first SRS resource set or the second SRS resource set; and
use the first SRS resource set or the second SRS resource set for receiving the SRS transmission based at least in part on setting the DCI format.

15. The base station of claim 12, wherein the second signaling is downlink control information signaling associated with a format 2_3.

16. The base station of claim 15, wherein the second signaling corresponds to an srs-ResourceSetToAddModList parameter,
wherein the particular SRS resource set is the second SRS resource set based at least in part on the first configuration information, the second configuration information, and the srs-ResourceSetToAddModList parameter.

17. The base station of claim 12, wherein the first configuration information is associated with a first list of SRS resource sets and the second configuration information is associated a second list of SRS resource sets.

18. The base station of claim 12, wherein the one or more processors are further configured to:
select the one of the first SRS resource set or the second SRS resource set as the particular SRS resource set based at least in part on the DCI format and a mapping configuration.

19. The base station of claim 18, wherein the second signaling is associated with one of formats 0_2 or 1_2, wherein the mapping configuration maps the formats 0_2 and 1_2 to an srs-ResourceSetToAddModListDCI-0-2 parameter, and
wherein the one of the first SRS resource set or the second SRS resource set that is included in the srs-ResourceSetToAddModListDCI-0-2 parameter is selected.

20. The base station of claim 18, wherein the second signaling is associated with a format 1_2, and
wherein the one of the first SRS resource set or the second SRS resource set is selected based at least in part on whether the first signaling or the second signaling configures the second configuration information.

21. The base station of claim 15, wherein the particular SRS resource set is the second SRS resource set based at least in part on the first configuration information and the second configuration information.

22. A method of wireless communication performed by a user equipment (UE), comprising:
receiving first signaling including:
first configuration information associated with identifying a first sounding reference signal (SRS) resource set of a plurality of SRS resource sets, and
second configuration information associated with identifying a second SRS resource set of the plurality of SRS resource sets;

receiving second signaling including a trigger for an SRS transmission associated with a particular SRS resource set of the plurality of SRS resource sets, the particular SRS resource set being one of the first SRS resource set or the second SRS resource set selected according to a downlink control information format of the second signaling; and
transmitting the SRS transmission associated with the particular SRS resource set.

23. The method of claim 22, wherein the second signaling is downlink control information signaling associated with a format 2_3.

24. The method of claim 22, wherein the first configuration information is associated with a first list of SRS resource sets and the second configuration information is associated a second list of SRS resource sets.

25. The method of claim 22, further comprising:
selecting the one of the first SRS resource set or the second SRS resource set based at least in part on the DCI format and a mapping configuration.

26. The method of claim 23, wherein the second signaling maps to an srs-ResourceSetToAddModList parameter, and further comprising:
selecting the one of the first SRS resource set or the second SRS resource set that is included in the srs-ResourceSetToAddModList parameter as the particular SRS resource set.

27. A method of wireless communication performed by a base station, comprising:
transmitting first signaling including:
first configuration information associated with identifying a first sounding reference signal (SRS) resource set of a plurality of SRS resource sets, and
second configuration information associated with identifying a second SRS resource set of the plurality of SRS resource sets;
transmitting second signaling including a trigger for an SRS transmission associated with a particular SRS resource set of the plurality of SRS resource sets, the particular SRS resource set being one of the first SRS resource set or the second SRS resource set selected according to a downlink control information format of the second signaling; and
receiving the SRS transmission associated with the particular SRS resource set.

28. The method of claim 27, wherein the second signaling is downlink control information signaling associated with a format 2_3.

29. The method of claim 27, wherein the first configuration information is associated with a first list of SRS resource sets and the second configuration information is associated a second list of SRS resource sets.

30. The method of claim 27, further comprising:
selecting the one of the first SRS resource set or the second SRS resource set as the particular SRS resource set based at least in part on the DCI format and a mapping configuration.

* * * * *